Oct. 27, 1964  E. J. ROTH  3,154,187
SYNCHRONIZED CONVEYOR UNITS AND ADJUSTING MEANS THEREFOR
Filed March 6, 1962  4 Sheets-Sheet 1
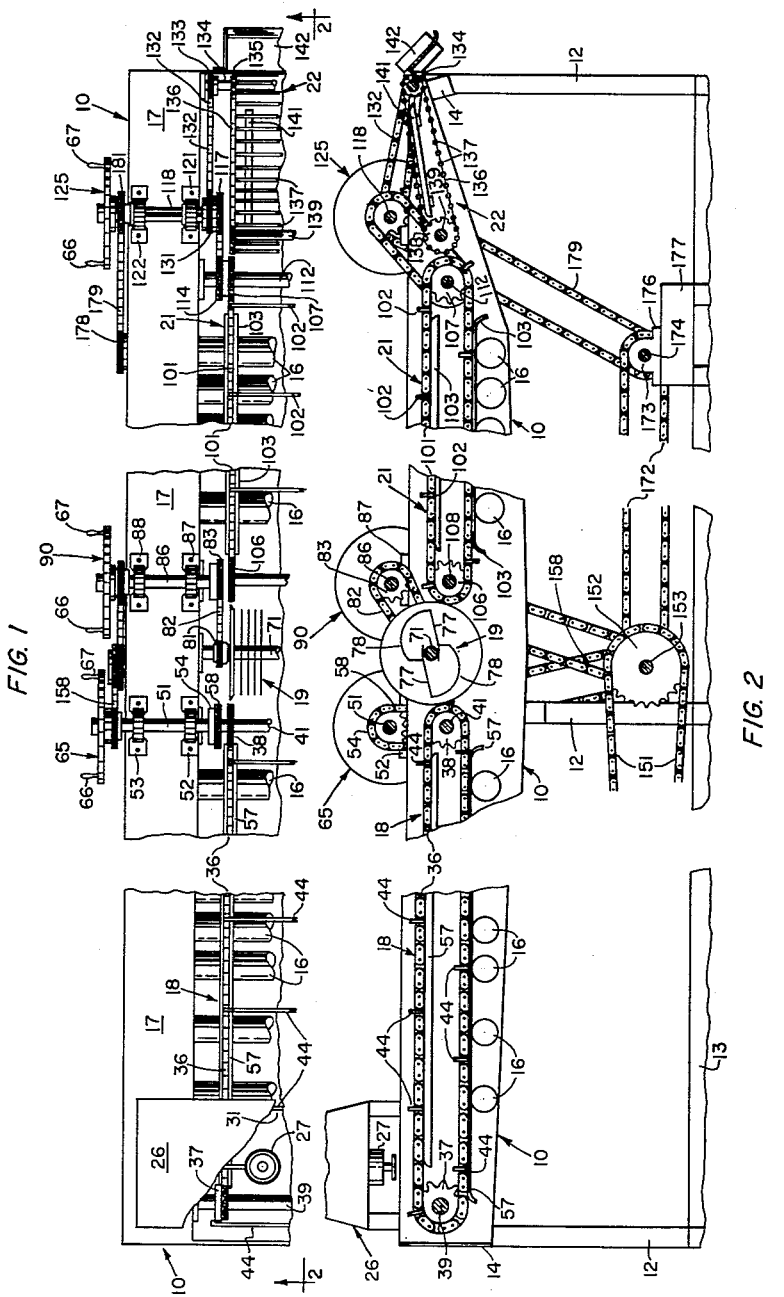
INVENTOR.
ERNEST J. ROTH
BY Richard J. Cowling Oct. 27, 1964  E. J. ROTH  3,154,187
SYNCHRONIZED CONVEYOR UNITS AND ADJUSTING MEANS THEREFOR
Filed March 6, 1962  4 Sheets-Sheet 2

INVENTOR.
ERNEST J. ROTH
BY Richard J. Cowling

Oct. 27, 1964   E. J. ROTH   3,154,187
SYNCHRONIZED CONVEYOR UNITS AND ADJUSTING MEANS THEREFOR
Filed March 6, 1962   4 Sheets-Sheet 3

INVENTOR.
ERNEST J. ROTH
BY
Richard J. Cowling

Oct. 27, 1964  E. J. ROTH  3,154,187
SYNCHRONIZED CONVEYOR UNITS AND ADJUSTING MEANS THEREFOR
Filed March 6, 1962  4 Sheets-Sheet 4
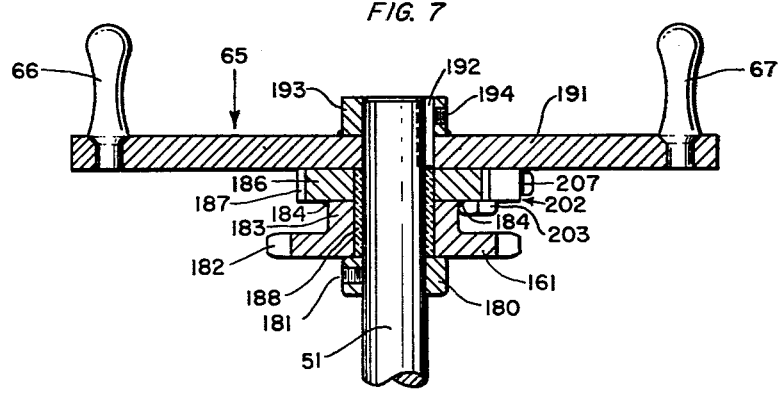
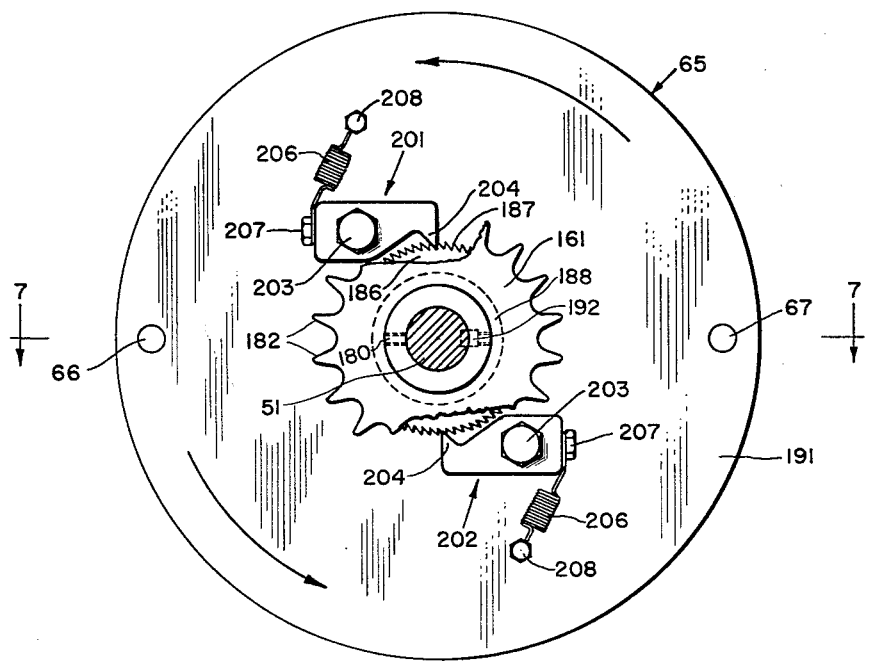
INVENTOR
ERNEST J. ROTH
BY
ATTORNEY

United States Patent Office 3,154,187
Patented Oct. 27, 1964

3,154,187
SYNCHRONIZED CONVEYOR UNITS AND ADJUSTING MEANS THEREFOR
Ernest J. Roth, Rockleigh, N.J., assignor to Joe Lowe Corporation, New York, N.Y., a corporation of Delaware
Filed Mar. 6, 1962, Ser. No. 177,863
4 Claims. (Cl. 198—33)

The present invention relates generally to a machine including a dough former and a synchronized conveyor, and it has particular relation to means for advancing the flight conveyor so that the dough forms being cut and dropped from the dough former may be kept moving in a continuous and uninterrupted stream.

The dropping time of any raw dough form which is cut and divided from a conventional dough former is dependent upon the size and stickiness of the dough. There is a direct relation between the size of the dough form and its time drop from the cutter head, and this difference is great enough between the smallest form cut and the largest form cut to cause the form to drop on the flights of the synchronized conveyor instead of between them. It will also be appreciated that different doughs are different in stickiness due to variations in the product or ingredient ratios, and that such stickiness causes the severed dough forms to cling or adhere longer to the cutter head or dividing mechanism, thereby causing a different time drop.

While the present invention is being described in conjunction with a conventional doughnut machine, it will be obvious that its application can be applied to any conveyor mechanism involving a dough former and a synchronized conveyor, as for example, a bun machine where the flights convey baking pans in synchronized timing under a dough former, and the dough forms are deposited directly into said baking pans. If the pans are not properly synchronized with the cutter head, the dough forms are likely to be deposited on the sides or ends of the pans, depending upon which way they are fed under the dough former.

Heretofore, in a doughnut machine conventional frying kettles have been equipped with a receiving flight conveyor, a turn-over device and a delivery flight conveyor, all operating at substantially the same speed and level in the cooking oil, for continuously moving the doughnut forms therethrough. In the larger commercial installations, in which dough forms of various sizes are fried, difficulty is frequently encountered in depositing the raw forms in the cooking oil so that they will be picked-up promptly by the next flight bar of the receiving conveyor, in releasing the cooked forms from the receiving conveyor in proper timed sequence with the turn-over device, and in placing the partially cooked turned-over dough forms in the proper flights of the delivery conveyor. These difficulties are seriously multiplied when production is changed from dough forms of a large diameter to dough forms of a small diameter, or vice versa. None of the conventional machines of the prior art has means for readily advancing the relationships of such flight conveyors with the turn-over device. As a result, great care has to be taken in the initial assembly of the machine, and, if at any time, such parts get out of proper sequential timing, it was necessary to partially dismantle the machine, and break the conveyor chain or chains to correct any improper timing.

With the present invention, each flight conveyor and the intermediate turn-over device is equipped with separate means, which will permit readjustments of the flight conveyors and/or the turnover device expediently, conveniently and instantly regardless of whether such conveyors are in operation or standing still without the necessity of dismantling any part of the machine or requiring the use of tools of any kind.

An object of the present invention is to provide a simple, economical and durable means for advancing the position of the flights of a receiving conveyor with respect of a dough former.

Another object of the invention is the provision of similar means for advancing the position of the turner hands of the turn-over device with respect to the flights of the receiving and/or delivery conveyors.

A further object of the invention is to provide similar means for advancing the position of the flights of the delivery conveyor with respect to the turner hands of the turn-over device independently thereof.

Another object of the invention is a series of independently operable devices for changing the relationship of the flights of the receiving conveyor with respect of the receiving hand of the turn-over device, the turn-over device and the flights of the delivery conveyor without requiring the operation of the machine to be stopped, the use of tools or the services of a skilled mechanic.

Other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, wherein like numerals indicate like parts, in which:

FIGURE 1 is a fragmentary top plan view of one side of a conventional kettle of a commercial doughnut frying machine, showing the receiving flight conveyor, the turn-over device and the delivery flight conveyor equipped with the principles of the invention;

FIGURE 2 is a fragmentary side elevational view of the kettle shown in FIGURE 1, the same having been taken substantially along the line 2—2 thereof, looking in the direction of the arrows;

Figure 3:
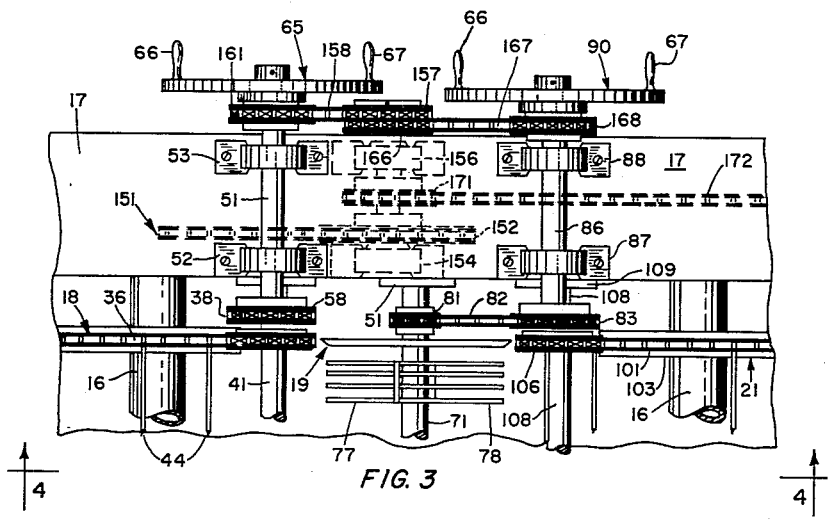
FIGURE 3 is an enlarged fragmentary top plan view of the turn-over device of the machine.

FIGURE 7 is an enlarged fragmentary cross-sectional view of the shifting wheel shown in FIGURE 8, the same having been taken substantially along the line 7—7 thereof, looking in the direction of the arrows; and FIGURE 8 is an enlarged fragmentary side elevational view of the ratchet-control shifting wheel connected to a conventional drive-shaft for manually advancing the turning-sequence of the unit operating on said shaft.

Referring now to the drawings, there is shown in FIGURES 1 and 2 a conventional frying kettle or vat 10, which is similar to that shown and described in detail in my Letters Patent No. 2,286,013, issued June 9, 1942. For the sake of clarity and brevity, the electric motor and reduction gear main driving unit have been left off the present drawings since they form no part of the present invention.

*The Frying Kettle*

The frying kettle 10 of the present invention is of a rectangular construction similar to that shown in my prior Letters Patent supra. It may be supported in any convenient manner as by a supporting frame consisting of spaced legs 12, longitudinal braces 13 and cross-braces 14. The kettle 10 may be heated in any convenient manner, as by a battery of gas burners, electric heating coils or other heating apparatus. In the illustration shown, the heating is accomplished by a series of longitudinally spaced conventional gas heating tubes 16, which extend transversely of the kettle 10 and through the sidewalls thereof. A pair of spaced side supporting platforms 17 extend along opposite sides of the kettle 10 and have sufficient supporting strength for mounting the moving parts of the ratchet wheel units of the machine, which form the present invention. The side supporting platforms 17 are, of course, securely mounted, as by welding, to the supporting frame structure for the frying kettle 10.

At the receiving end of the frying kettle 10, there is mounted a conventional dough former 26, having a series of transversely spaced forming dies 27 projecting downwardly over the receiving end of the receiving conveyor 18.

The Receiving Conveyor

The receiving conveyor 18 consists of a pair of transversely spaced chains 36 mounted over longitudinally spaced rear sprocket wheels 37 and forward sprocket wheels 38. The transversely spaced sprocket wheels 37 at the receiving or rear end of the machine are keyed to a shaft 39 whose ends are secured in bearing blocks (not shown) mounted on opposite sides of the supporting frame structure. The opposite or forward end of the receiving conveyor 18 has spaced sprocket wheels 38 keyed to a shaft 41 likewise journalled in spaced bearing blocks (not shown). The receiving conveyor 18 has a series of longitudinally spaced transversely extending flight bars 44, which are of a conventional construction and operate in a conventional manner to move the dough forms (not shown) floating in the cooking oil (not shown) forwardly into the turn-over device 19.

The chains 36 of the receiving conveyor 18 are relatively long and extend substantially half the length of the frying kettle 10. They require supporting rails 57 thereunder, which serve to prevent sagging and maintain them in substantially a horizontal position.

Mounted directly above the shaft 41 is a second shaft 51, which is journalled in spaced bearing blocks 52 and 53 mounted on one of the side supporting platforms 17 of the frying kettle 10. The shaft 51 has a sprocket wheel 54 keyed thereto in vertical alignment with a second sprocket wheel on the shaft 41. A chain 58 connects the sprocket wheels 54 and 56 in operating arrangement. One end of the shaft 51 has a ratchet wheel unit 65 keyed thereto, having spaced manipulating handles 66 and 67 for manually operating the unit 65, which is shown in detail in FIGURES 7 and 8 and will be hereinafter more fully described.

The Turn-Over Device

Figure 4:
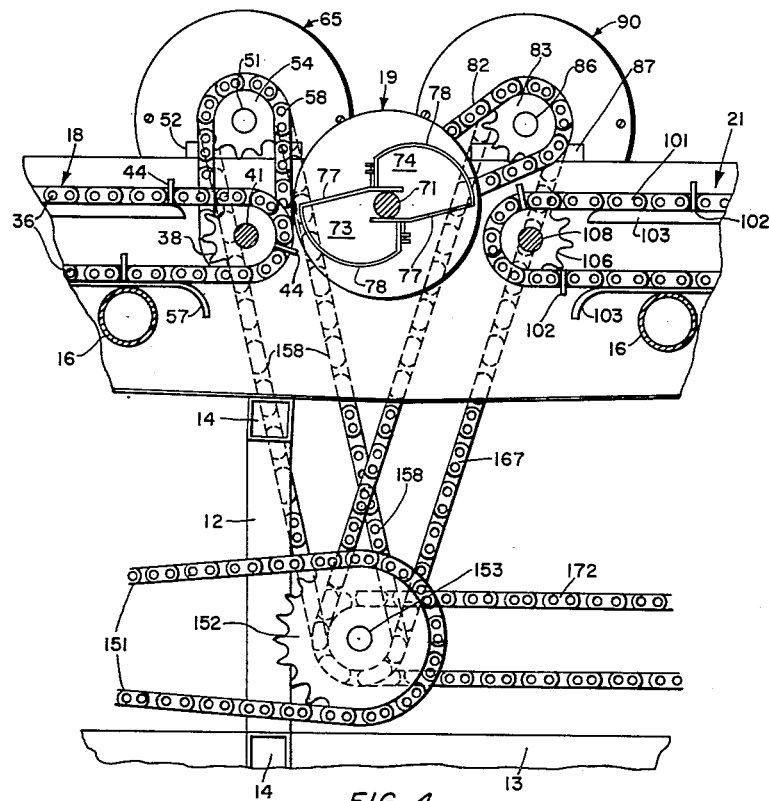
FIGURE 4 is a fragmentary side elevational view of that part of the machine shown in FIGURE 3, the same having been taken substantially along the line 4—4 thereof, looking in the direction of the arrows.

Referring now to FIGURES 3 and 4, there is mounted transversely of the frying kettle 10, at the discharge end of the receiving conveyor 18, a turn-over device 19 for receiving the partially fried dough forms from the receiving conveyor 18, turning them over and transferring them to the receiving end of the delivery conveyor 21. The turn-over device 19 is mounted fixedly on a shaft 71 mounted in suitable transversely spaced bearing blocks 72. In the present illustration, the turner hands 73 and 74 are formed of a series of transversely spaced wire loops. Each turner hand has one flat side 77 which receives the partially cooked form and transfers it to the receiving end of the delivery conveyor 21, and one round side 78 which serves as a stop for the partially cooked dough forms until the next turner hand 77 moves into receiving position. Obviously, the construction of the turn-over device 19 forms no part of the present invention since any conventional turning device might be used in the machine. Therefore, the details of its construction are of no further importance.

The shaft 71, on which the turn-over device 19 has been mounted between the spaced chains of the receiving conveyor 18, has a sprocket wheel 81 keyed thereto and spaced outwardly from the conveyor 18 (see FIG. 3). A chain 82 connects the sprocket wheel 81 with a sprocket wheel 83, which, in turn, is keyed to the inner end of a shaft 86. The shaft 86 is mounted transversely of the kettle 10 in suitably spaced bearing brackets 87 and 88, which are bolted to the top of the side supporting platform 17. The opposite or outer end of the shaft 86 has a ratchet unit 90 keyed thereto, having spaced handles 66 and 67 for manually manipulating the same. This ratchet unit 90 is identical in construction to the ratchet unit 65 on the receiving conveyor 18, which is shown in FIGURES 7 and 8, and serves to reset the timing of the turn-over device 19.

The Delivery Conveyor

Mounted forwardly of the turn-over device 19 is a delivery conveyor 21 consisting of transversely spaced chains 101 connected transversely at longitudinally spaced intervals by a series of flights 102. The chains 101, which are relatively long and extend substantially one-half the length of the kettle 10, require supporting rails 103, which serve to prevent sagging and to maintain said chains in substantially a horizontal position. The chains 101 are mounted over longitudinally space sprocket wheels 106 and 107. The sprocket wheel 106, which is at the receiving end of the delivery conveyor (see FIGURES 3 and 4) is keyed to a shaft 108 mounted in transversely spaced bearing brackets 109 secured to the main frame structure in a conventional manner (see FIG. 3).

Figure 5:
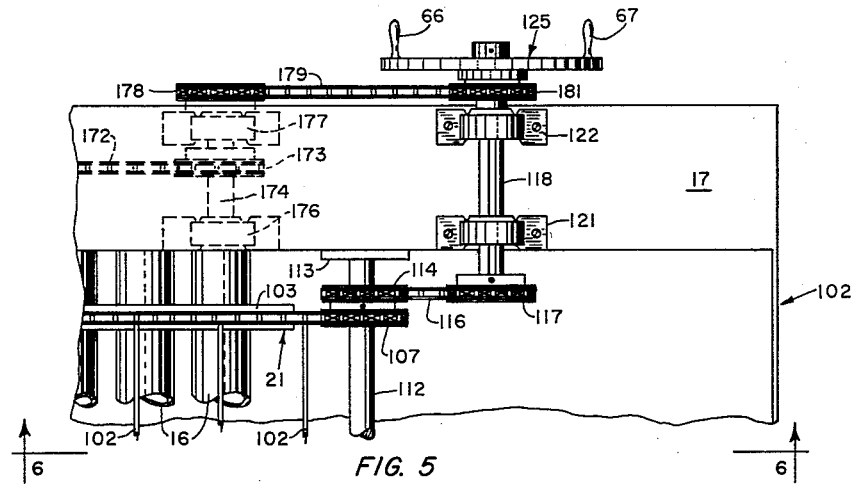
FIGURE 5 is an enlarged fragmentary top plan view of the delivery end of the delivery conveyor, with the discharge conveyor deleted for reasons of clarity, showing the same embodying the principles of the invention.
Figure 6:
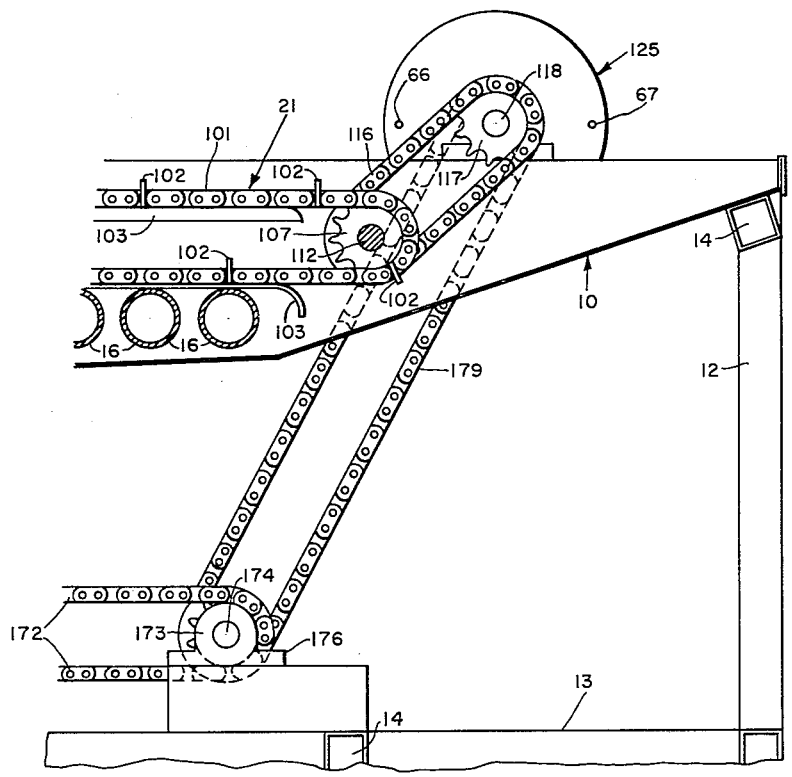
FIGURE 6 is a side elevational view of that part of the machine shown in FIGURE 5, the same having been taken substantially along the line 6—6 thereof, looking in the direction of the arrows.

The sprocket wheel 107, which is at the discharge end of the delivery conveyor 21 is keyed to a transversely extending shaft 112 (see FIGURES 5 and 6), whose opposite ends are journalled in suitable bearing brackets 113 secured to the main frame structure. The shaft 112 has a second sprocket wheel 114 keyed thereto outside of the conveyor 21, which drives a chain 116 that enmeshes a second sprocket wheel 117. The sprocket wheel 117 is keyed to a shaft 118, which is journalled in spaced bearing blocks 121 and 122 mounted on one of the side supporting platforms 17 of the frying kettle 10. On the outer free end of the shaft 118 there is mounted a ratchet wheel unit 125 keyed thereto, having spaced handles 66 and 67 for manually manipulating the same. This unit is identical in construction with the unit 65, which is shown in detail in FIGURES 7 and 8 and will be hereinafter more fully described.

The Discharge Conveyor

Referring again to FIGURES 1 and 2, a third sprocket wheel 131 is also keyed to the shaft 118 between the sprocket wheel 117 and the bearing block 121. This sprocket wheel 131 drives a chain 132 which drives a sprocket wheel 133 keyed to a shaft 134 extending transversely of the frying kettle 10. The shaft 134 has a pair of spaced sprocket wheels 135 mounted inwardly thereof, which drive a pair of spaced chains 136. Mounted transversely of the chains 136 in longitudinally spaced arrangement are a series of rods 137, which form a discharge conveyor 22. The opposite ends of the chains 136 are entrained over correspondingly spaced sprockets 138 rotatably mounted on a shaft 139. The rods 137 have a pair of spaced supporting rails 141 mounted therebelow to prevent undue sagging and to maintain a proper level. The frying kettle 10 is provided with a suitable discharge chute 142 below the discharge end of the discharge conveyor 22.

Main Drive Unit

The operation of the machine may be accomplished with a single main driving unit consisting of a conventional electric motor and reduction gear box. The driving end of the chain 151 (see FIG. 2), which is driven from the reduction gear box, engages a sprocket wheel 152, which is keyed to a transversely extending main drive shaft 153. The shaft 153 is journalled in suitably spaced bearing blocks 154 and 156 mounted on the main frame structure (see FIGURES 3 and 4).

The main drive shaft 153 has a second sprocket wheel 157 keyed to one end thereof, which operates a chain 158, whose opposite end engages a sprocket wheel 161 which is part of the ratchet unit 65. (See FIGURES 7 and 8.) This arrangement provides a suitable drive for the receiving conveyor 18.

The main drive shaft 153 has a third sprocket wheel 166 keyed adjacent and inside of the second sprocket wheel 157, which operates a chain 167, whose opposite end engages a sprocket wheel 168, which is part of the ratchet wheel unit 90. This arrangement provides a suitable drive for turn-over device 19 through the sprocket wheel 83, chain 82, sprocket wheel 81 and drive shaft 71.

The main drive shaft 153 also has a fourth sprocket wheel 171 keyed thereto (see FIG. 3), which operates a chain 172 whose opposite end engages a sprocket wheel 173 (see FIG. 6) keyed to a transversely extending shaft 174, which is suitably journalled in spaced bearing blocks 176 and 177 mounted on conventional supports. (See FIG. 6.) The shaft 174 has a second sprocket wheel 178 keyed thereto, which drives a chain 179. The opposite end of the chain 179 engages a sprocket wheel 181, which is part of the ratchet unit 125. This arrangement provides a suitable drive for the delivery conveyor 21, and the discharge conveyor 22.

*Ratchet Wheel Units*

Referring now to FIGURES 7 and 8, there is shown in detail the construction of the ratchet unit 65. Since the ratchet units 90 and 125 are identical in construction to the ratchet wheel 65, it is not believed necessary to describe each of them again in detail.

The ratchet wheel unit 65, which is mounted removably on the projecting end of the shaft 51 by means of a collar 180, which has a set screw 181. The sprocket wheel 161 has an integrally formed hub 183. Welded to the hub 183, as indicated at 184, is a ratchet wheel 186. It will be noted that the ratchet wheel 186 has many more and smaller teeth 187 than the sprocket wheel 161. A bushing 188 is mounted on the shaft 51 and extends through the sprocket wheel 161 and ratchet wheel 186. A large wheel disc 191 is mounted on the shaft 51 by means of a key 192, and has a hub 193 welded thereto. The hub 193 has a set screw 194 by which the wheel disc assembly may be fixedly positioned on the shaft 51.

The ratchet wheel unit 65 has two pawls 201 and 202 spaced approximately 180 degrees on the wheel disc 191. Each pawl is pivotally mounted on the wheel disc 191 by means of a bolt 203 so that its hooked edge 204 can engage the teeth thereof. Each pawl has a spring urging means 206. One end of the spring 206 is mounted by means of a bolt 207 to the outer end of the pawl, and the opposite end of the spring 206 is fastened to the wheel disc 191 by a bolt 208. The spring 206, in this arrangement, keeps the hooked end 204 of each of the pawls 201 and 202 in contact with the teeth 187 of the ratchet wheel 186.

In the construction shown and described there are four teeth 187 to each tooth 182 on the sprocket wheel 161. The two pawls 201 and 202 are arranged so that only one pawl is in operating engagement with the ratchet wheel teeth 187 at a time. In FIGURE 8, it will be noted only the hooked edge of the pawl 201 engages a tooth 187 on the ratchet wheel 186. This arrangement gives adjustment in increments of one-half of each tooth 187 with each movement of the pawls on the ratchet wheel 186. If four pawls were to be mounted on the wheel disc 191 in spaced relation of approximately ninety degrees from each other, it would be possible to make an adjustment each to one-fourth tooth on the ratchet wheels. It will be noted that the pawls are so assembled that the wheel disk 191 must be moved by the handles 66 and 67 in the same direction in which the conveyor 18 is moving. This means that any adjustment for the flights 44 of the conveyor 18 will be pulled forwardly with the directional movement of the conveyor and not pushed oppositely to such normal movement.

The ratchet wheel unit 90, which controls the adjustment for the turn-over device 19, is mounted on the end of the shaft 86 so that it must also be moved in the direction of the normal rotation of said turn-over device 19.

Likewise, the ratchet wheel unit 125 is mounted on the end of the shaft 118 of the delivery conveyor 21 so that the adjustments made thereby must be moved in the direction of movement of said shaft 118 and conveyor 21.

Obviously, with each of the adjustment movements of the ratchet wheel units 65, 90 and 125 being made in the direction of the normal movement of such parts, it follows that said adjustments may be made while each unit is in operation as well as when each unit is standing still.

*The Operation of the Machine*

Assuming the machine is in operation with all units operating and the dough former 26 is being operated intermittently so that the dough forms are dropped between each pair of flights 44 on the receiving conveyor 18, it is obvious that the flights 44 will move the partially fried dough forms onto the turner blades 77 in properly timed sequence. However, if change is made in the former so that the size of the dough forms are reduced, as for example to approximately one-half the previous diameter, there is a possibility the turn-over blade 77 will be above the cooking level when the flight bar 44 is at the end of the conveyor. Consequently, the partially cooked dough form will strike the arcuate end 78 of the turn-over device 19 and be held by it until the next blade 77 is moved into receiving position. By this time, the succeeding flight bar 77 has moved up its partially cooked dough forms and there will be a gang-up at the turn-over device 19. This situation can be corrected by adjusting the turn-over device 19 so that the turner hand 77 will not move into position until the corresponding flight bar 44 is at the end of the receiving conveyor 18.

With the present invention, either the ratchet wheel assembly 65 on the receiving conveyor 18 or the ratchet wheel assembly 90 on the turn-over device 19 may be manipulated to compensate for the change in size of the dough forms being fried. If in manipulating the turn-over device 19, the turning with the delivery conveyor 21 is thrown out, it can be readily regulated by the ratchet wheel assembly 125 on the delivery conveyor 21. There is no need to regulate the discharge conveyor 36 since its only function is to remove the cooked doughnuts from the frying kettle 10 as quickly as possible so that they may be passed on to the next operation, which may be cooling, coating with chocolate or other similar type of coating, dusting with sugar and/or merely packaging.

Although I have shown and described only one form which the invention may assume, it will be apparent to those skilled in the art that the invention is not to be so limited, but that various other modifications may be made therein without departing from the spirit thereof.

What I claim is:

1. In a machine of the class described comprising a frying kettle, a dough former mounted above and adjacent one end of said kettle, an endless conveyor for receiving dough forms deposited in said kettle by said former, said endless conveyor having a pair of shafts spaced longitudinally of said kettle, means for driving one of said shafts, a pair of transversely spaced sprocket wheels mounted on each of said shafts, the sprocket wheels on said driven shaft being keyed thereto, a pair of endless chains entrained one each over each aligned pair of longitudinally spaced sprocket wheels, said chains having a plurality of longitudinally spaced flight bars mounted therebetween for moving the deposited dough forms away from said dough former toward the opposite end of said kettle, and, in combination, with said driven shaft of said endless conveyor, (a) a wheel disc attached fixedly to said driven shaft,
   (b) said wheel disc being connected to one of said sprocket wheels keyed to said shaft through a ratchet unit assembly,
   (c) said ratchet unit assembly mounted on said shaft and having a ratchet wheel connected fixedly with said keyed sprocket wheel,
   (d) said ratchet wheel having a relatively large number of circumferentially spaced teeth as compared to the number of teeth of said sprocket wheel, and
   (e) said ratchet unit having at least one pawl mounted on said wheel disc for engaging said teeth of said ratchet wheel, whereby when said wheel disc is moved independently of said driving means in the direction of rotation of its driven shaft said sprocket wheel will be moved forwardly to advance said shaft in increments of less than the spacing of the teeth on said sprocket wheel, thereby advancing the entrained chains to synchronize their spaced flight bars with said deposits of dough from said former.

2. In a machine of the class described comprising a frying kettle, a dough former mounted above and adjacent one end of said kettle, an endless receiving conveyor for receiving dough forms deposited in said kettle by said former, a turn-over device mounted at the discharge end of said receiving conveyor, and an endless delivery conveyor for receiving the turned over dough forms from said turn-over device, means for driving said conveyors and turn-over device, said means for driving said turn-over device including a shaft and a sprocket wheel keyed thereto, and, in combination, with said shaft and sprocket wheel (a) a wheel disc attached fixedly to said shaft,
   (b) said wheel disc being connected to said shaft through a ratchet unit assembly,
   (c) said ratchet unit assembly mounted on said shaft and having a ratchet wheel connected fixedly with said sprocket wheel,
   (d) said ratchet wheel having a relatively large number of peripherally spaced teeth as compared to the number of teeth of said sprocket wheel,
   (e) said ratchet unit having at least one pawl mounted on said wheel disc for engaging said teeth of said ratchet wheel, whereby when said wheel disc is moved independently of said driving means in the direction of rotation of said driven shaft said sprocket wheel will be moved forwardly by said pawl to advance said shaft in increments of less than the spacing of the teeth on said sprocket wheel, thereby advancing said turn-over device to synchronize the same with the flight bars of said endless conveyors.

3. In a machine of the class described comprising a frying kettle, a turn-over device mounted intermediate the ends of said kettle, an endless delivery conveyor for receiving dough forms from said turn-over device and advancing them to the delivery end of said kettle, said endless conveyor having a pair of shafts spaced longitudinally of said kettle, means for driving one of said shafts, a pair of transversely spaced sprocket wheels mounted on each of said shafts, the sprocket wheels on said driven shaft being keyed thereto, a pair of endless chains entrained one each over each aligned pair of longitudinally spaced sprocket wheels, said chains having a plurality of longitudinally spaced flight bars mounted therebetween for moving the turned-over dough forms away from said turn-over device toward the opposite end of said kettle, and, in combination, with said driven shaft of said delivery conveyor, (a) a wheel disc attached fixedly to said driven shaft,
   (b) said wheel disc being connected to one of said sprocket wheels keyed to said shaft through a ratchet unit assembly,
   (c) said ratchet unit assembly mounted on said shaft and having a ratchet wheel connected fixedly with said keyed sprocket wheel,
   (d) said ratchet wheel having a relatively large number of circumferentially spaced teeth as compared to the number of teeth of said sprocket wheel, and
   (e) said ratchet unit having at least one pawl mounted on said wheel disc for engaging said teeth of said ratchet wheel, whereby when said wheel disc is moved independently of said driving means in the direction of the rotation of its driven shaft said sprocket wheel will be moved forwardly to advance said shaft in increments of less than the spacing of the teeth on said sprocket wheel, thereby advancing the entrained chains to synchronize their spaced flight bars with said turned-over dough forms from said turn-over device.

4. In a machine of the class described comprising a frying kettle, a dough former mounted above and adjacent one end of said kettle, an endless conveyor having longitudinally spaced flights for receiving dough forms deposited in said kettle by said former for delivery to a turn-over device, a turn-over device and an endless delivery conveyor having longitudinally spaced flights for receiving the turned-over dough forms from said turn-over device and advancing them toward the delivery end of said kettle, means for driving said endless conveyors and said turn-over device, said means including a driven shaft on said conveyors and said turn-over device, and, in combination, with each of the driven shafts of said endless conveyors and said turn-over device, (a) a wheel disc attached fixedly to each of said driven shafts,
   (b) said wheel discs being connected one each to a sprocket wheel keyed to each of said shafts through a ratchet unit assembly,
   (c) said ratchet unit assembly mounted on said shaft and having a ratchet wheel connected fixedly with said keyed sprocket wheel, said ratchet wheel having a relatively large number of circumferentially spaced teeth as compared to the number of teeth of said sprocket wheel, and
   (d) said ratchet unit having at least one pawl mounted on said wheel disc for engaging said teeth of said ratchet wheel
      (1) whereby when said wheel disc is moved independently of said driving means in the direction of the rotation of its driven shaft said sprocket wheel will be moved forwardly thereby advancing its unit accordingly for synchronization with the other moving units of said machine.

References Cited in the file of this patent

UNITED STATES PATENTS

| | | |
|---|---|---|
| 1,904,370 | Hunter | Apr. 18, 1933 |
| 2,356,120 | Slightam | Aug. 15, 1944 |
| 2,732,927 | Hansen | Jan. 31, 1956 |